(12) United States Patent
Jonsson et al.

(10) Patent No.: US 8,483,215 B2
(45) Date of Patent: Jul. 9, 2013

(54) METHOD AND APPARATUS FOR IDENTIFYING OTHER USER EQUIPMENT OPERATING IN A WIRELESS COMMUNICATION NETWORK

(75) Inventors: Elias Jonsson, Malmö (SE); Andres Reial, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 77 days.

(21) Appl. No.: 13/291,900

(22) Filed: Nov. 8, 2011

(65) Prior Publication Data

US 2013/0114429 A1    May 9, 2013

(51) Int. Cl.
*H04L 12/56* (2006.01)
*H04J 1/16* (2006.01)

(52) U.S. Cl.
USPC ............ 370/389; 370/252; 370/329; 370/386

(58) Field of Classification Search
USPC .................................. 370/252, 329, 389, 386
See application file for complete search history.

(56) References Cited

U.S. PATENT DOCUMENTS

| | | | |
|---|---|---|---|
| 2006/0239457 A1* | 10/2006 | Ridler et al. | 380/212 |
| 2010/0278037 A1 | 11/2010 | Jen et al. | |
| 2010/0304748 A1 | 12/2010 | Henttonen et al. | |

FOREIGN PATENT DOCUMENTS
WO    2010/127984 A1    11/2010

OTHER PUBLICATIONS

3D Generation Partnership Project (3GPP), "Technical Specification Group Radio Access Network; Multiplexing and channel coding (FDD) (Release 10)," 3GPP TS 25.212 v.10.1.0, Dec. 2010, 3GPP, Sophia Antipolis Cedex, France.

* cited by examiner

*Primary Examiner* — John Pezzlo
(74) *Attorney, Agent, or Firm* — Coats & Bennett, P.L.L.C.

(57) ABSTRACT

The present invention includes a method and apparatus for autonomously determining by a first UE the identities (IDs) of one or more other UEs that are operating in or around the same network area as the first UE. More particularly, the first UE determines with a defined reliability the UE ID of an otherwise unknown UE based on receiving and processing an HS-SCCH transmission targeted to the unknown UE. By learning actual UE IDs for one or more other UEs operating in or around the same area as the first UE, the first UE can then properly decode HS-SCCH transmissions to those other UEs, and thereby gain knowledge of the signal structures used for data (HS-PDCH) transmissions to those other UEs. Advantageously, the first UE applies such knowledge in its desired-signal receiver processing, such as for enhancing channel estimation and/or performing structured-signal interference cancellation.

31 Claims, 6 Drawing Sheets

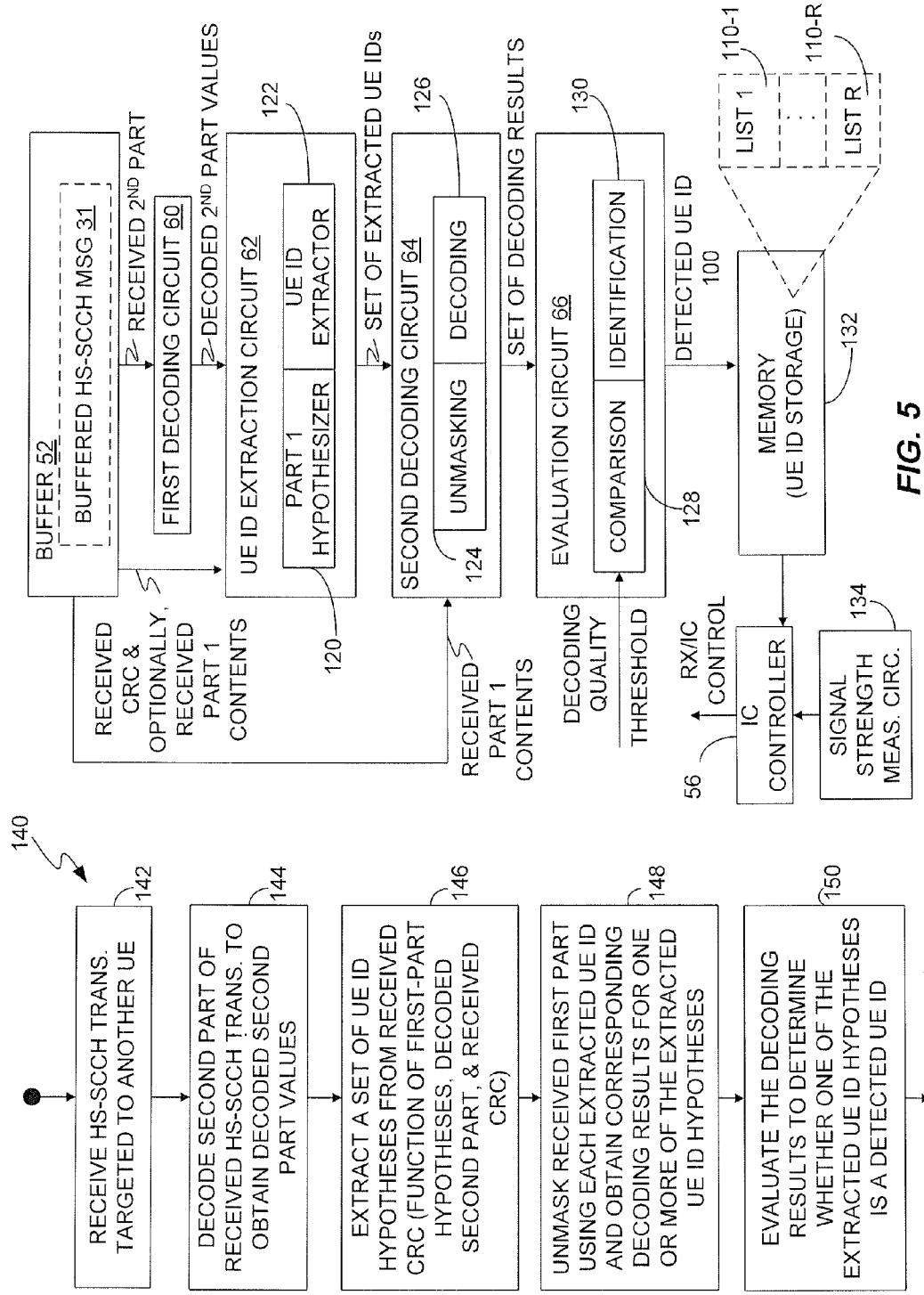

METHOD AND APPARATUS FOR IDENTIFYING OTHER USER EQUIPMENT OPERATING IN A WIRELESS COMMUNICATION NETWORK

TECHNICAL FIELD

The present invention generally relates to wireless communication networks, and particularly relates to identifying other user equipment operating in such a network.

BACKGROUND

In wireless communication networks, increasing high data rate availability at the cell edge is a key aspect in improving overall network capacity and the individual user experience. In many networks, the cell edge performance is not limited by the available signal power, or the user equipment (UE) receiver sensitivity. Instead, the main limitation comes from the interference from neighboring cell base stations.

A typical measure of the signal quality experienced by a given UE is the ratio of the own-cell (desired) signal power to the total other-cell interference plus noise power. That ratio is also known as the "geometry factor." A given cell in the network functions as the "serving" cell for the UE, and the other-cell interference arises from one or more neighboring base stations operating on the same carrier frequency as the serving cell base station. The (white) noise is typically due to the UE receiver noise, but may also include leakage from neighboring carriers, other systems, etc.

Advanced receiver structures may be used to improve the effective geometry factor. For example, the Third Generation Partnership Project (3GPP) specifications for High Speed Downlink Packet Access (HSDPA) define an enhanced receiver capability referred to as "Type 3i." Type 3i receiver features include a linear dual-antenna receiver that utilizes its spatial degree of freedom to steer a spatial null towards the dominant interfering neighboring cell signal. The interfering signal is treated statistically, without invoking assumptions about its internal signal structure or data contents. In scenarios where one neighbor cell dominates, attractive gains may be available from such suppression, at least under certain channel conditions.

While the linear Type 3i receiver may offer gains in some situations, its efficiency is limited by the constraints intrinsic to linear receivers in general. The spatial degrees of freedom are limited to the number of antennas, i.e., a dual-antenna receiver can suppress one dominant interferer while receiving a desired signal from the own cell. At the same time, by spending the available degree of freedom on neighbor-cell suppression, the spatial suppression feature is no longer available for mitigating multipath-induced interference.

Unfortunately, in CDMA-based systems, like WCDMA/HSPA, inter-symbol interference (ISI) and multi-user interference (MUI) caused by dispersive channels represent major performance-degrading elements. In that regard, reduction in the ISI suppression capability is an undesirable side effect of linear neighbor-cell suppression. Further, when more than one cell contributes significant interference, linear receivers cannot suppress them simultaneously.

A well-known alternative to linear interference suppression is interference cancellation (IC). In that case, the interfering signal is no longer considered statistically, but its internal structure is explicitly utilized. Interference cancellation involves estimating the contents (partial or full) of the interferer, regenerating the interferer's signal contribution, and explicitly subtracting the resulting interference estimate from the received signal prior to demodulating and decoding the received signal.

Typically, HSDPA data makes up most of the transmitted signal power from a HSDPA base station (BS). Essential information required for performing HS data demodulation and decoding is transmitted to individual UEs via the High Speed Shared Control Channel (HS-SCCH) channel. For example, the control signaling comprising a given HS-SCCH transmission to a particular UE includes a first part that tells the UE what signal structure will be used to make a corresponding data transmission to the UE on a High Speed Physical Downlink Shared Channel (HS-PDSCH), and a second part that provides the UE with transport format information for that corresponding HS-PDSCH data transmission.

In particular, the first part of an HS-SCCH transmission includes parameters like modulation (QAM) order, the (channel) code allocation used for the corresponding HS-PDSCH data transmission, and the MIMO rank of that transmission. This first part ("Part 1") may be broadly regarded as containing "demodulation information" needed by the targeted UE for properly demodulating the HS-PDSCH transmission targeted to that UE.

In complementary fashion, the second part ("Part 2") of the HS-SCCH transmission includes transport format information, required by the UE for proper decoding of the HS-PDSCH transmission. For example, Part 2 includes information like the transport block size, code rate, and HARQ process info, etc. The first and second parts of an HS-SCCH transmission are individually coded and a common CRC is included in Part 2.

While the interested reader may refer to Section 4.6 of the 3GPP Technical Specification entitled "TS 25.212" for exhaustive details, here it suffices to explain that Part 1 of an HS-SCCH transmission is "masked" with the identity (ID) of the specific UE targeted by the transmission, according to a known masking function. Because the conventional behavior of UEs is to "look" for HS-SCCH transmissions individually targeted to them, HS-SCCH processing traditionally involves each UE using its own (known) ID to blindly detect Part 1 transmissions masked with the UE's ID. Once such a transmission is detected, the UE uses the decoded Part 1 and Part 2 contents to determine the signal structure and transport format of the correspondingly targeted HS-PDSCH data transmission, for proper reception, demodulation, and decoding of that corresponding data transmission.

Notably, Part 2 of an HS-SCCH transmission is not masked, except that Part 2 includes or is otherwise appended with a Cycle Redundancy Check (CRC) value that is masked with the UE ID. The CRC is computed over the (unmasked) contents of Part 1 and Part 2 at the transmitter. Therefore, in conventional processing, the UE uses its own known identity to unmask the CRC of an HS-SCCH transmission that has been determined from the Part 1 masking as being targeted to it, and then confirms Part 1 and Part 2 decoding using the unmasked CRC.

Coordinated Multi-Point (CoMP) transmission schemes, either centralized or distributed, represent one approach to reducing interference in multi-cell/multi-user wireless communication networks. According to CoMP operation, transmissions are jointly coordinated across multiple base stations, to reduce other-cell interference. However, in older (legacy) networks that do not implement CoMP, neighbor-cell transmissions are not "cooperative" and a given UE operating in its serving cell has no signal structure (Modulation and Coding Scheme or MCS) information available for users other than itself. That is, HS-SCCH transmissions to a first UE identify the MCS to be used for data transmissions on the HS-PDSCH to the first UE, but that first UE does not have signal structure information for potentially interfering HS-PDSCH data transmissions to other users, e.g., other UEs in the same or neighboring cells receiving HS-PDSCH transmissions that interfere with the first UE's reception of its targeted HS-PDSCH transmission.

While the modulation parameters (QAM mode, code allocation), required for pre-decoding IC, may be detected blindly, the detection quality may not be sufficient for robust operation. Moreover, blind detection of the transport format of interfering HS-PDSCH transmissions is not feasible and that prevents the use of better-performing post-decoding IC. Therefore, efficient neighbor-cell IC in HSDPA requires access to the interfering user's HS-SCCH information, implying the ability to infer its UE ID.

There are known approaches aimed at obtaining the IDs of UEs that are active in or around a given UE, but such approaches presume knowledge of the Part 1 transmission contents targeting such other users. Heretofore, there has been no high-performance, generally applicable mechanism for identifying the IDs of unknown UEs that are active in or around a given UE, which limits the opportunities for improving HSDPA performance in legacy (non-CoMP) systems.

SUMMARY

The present invention includes a method and apparatus autonomously determining by a first UE the identities (IDs) of one or more other UEs that are operating in or around the same network area as the first UE. More particularly, the first UE determines with a defined reliability the UE ID of an otherwise unknown UE based on receiving and processing an HS-SCCH transmission targeted to the unknown UE. By learning actual UE IDs for one or more other UEs operating in or around the same area as the first UE, the first UE can then properly decode HS-SCCH transmissions to those other UEs, and thereby gain knowledge of the signal structures used for data (HS-PDCH) transmissions to those other UEs. Advantageously, the first UE applies such knowledge in its desired-signal receiver processing, such as for enhancing channel estimation and/or performing structured-signal interference cancellation.

According to one embodiment taught herein, a first UE is configured to detect UE IDs for one or more other UEs operating in or around an area in which the first UE is operating. In an example configuration, the first UE includes a wireless communication transceiver configured to send and receive wireless signals, including receiving an HS-SCCH transmission targeted to another UE. As is known, the HS-SCCH transmission includes a first part that is masked with the UE ID of the other UE, a second part that is not masked, and a CRC that is masked. The CRC is computed over first part contents encoded in the first part and second part contents encoded in the second part.

Further, the first UE includes one or more processing circuits that are operatively associated with the wireless communication transceiver and are configured to decode the received second part, to obtain decoded second part values, which are assumed to correctly represent the second part contents. The processing circuits are further configured to extract a set of UE ID hypotheses from the received CRC using the decoded second part values taken in combination with respective first part content hypotheses taken from a known set of possible first part contents. This aspect of processing is possible because there are a limited number of possibilities for the first part and these possible values are known to the first UE. As such, the first UE can obtain unmasked candidate CRC values, one for each first part content hypothesis, and use each candidate CRC in combination with the received CRC, which is masked with the unknown UE ID according to a masking function known to the first UE, to extract a UE ID hypothesis for each candidate CRC.

Correspondingly, the one or more processing circuits of the first UE are configured to unmask the received first part using each extracted UE ID hypothesis, to obtain corresponding unmasked values and decode the unmasked values for one or more of the extracted UE ID hypotheses, to obtain a decoding result corresponding to each such extracted UE ID hypothesis. Such processing can be understood as yielding a set of decoding results corresponding to the set of extracted UE ID hypotheses, or to a subset thereof in the case that decoding results are generated for fewer than all extracted UE ID hypotheses in the set of UE ID hypotheses. In turn, the one or more processing circuits are configured to evaluate the set of decoding results to determine whether a UE ID has been successfully detected.

In one embodiment, a decoding result is obtained for each of one or more UE ID hypotheses by performing Viterbi decoding of the unmasked values of the first part, as obtained using each such UE ID hypothesis. The resulting Viterbi decoder output sequence is compared to the first part content hypothesis that was used to obtain the UE ID hypothesis. If they match, the decoding result is marked as successful and its decoding quality metric is computed. If more than one successful decoding result is found—i.e., if decoding is successful for more than one UE ID hypothesis—the UE ID hypothesis corresponding to the decoding result having the best metric is identified as a detected UE ID.

In at least one implementation of this approach, determining whether a valid UE ID has been detected comprises determining whether any of the decoding results exceeds a defined decoding quality threshold and, when such condition is met, identifying the extracted UE ID hypothesis corresponding to the decoding result having a highest decoding quality as a detected UE ID and store the detected UE ID. In a simplified embodiment of this approach, metric computation is omitted and the first successfully decoded candidate is identified as a detected UE ID.

In one or more embodiments, such processing is carried out on an ongoing or repeating basis, such as where the UE attempts to detect one or more UE IDs in every Transmission Time Interval (TTI) of a WCDMA/HSDPA network. Broadly, according to such operation, the UE dynamically maintains one or more lists of detected UE IDs, which the UE may use in any given TTI to eavesdrop on HS-SCCH transmissions targeting the corresponding other UEs. Information gained by that eavesdropping, such as learning the signaling structure to be used for making a corresponding data transmission to one of the other UEs, is used by the UE in its desired-signal processing, such as in channel estimation or interference cancellation processing.

In a corresponding method, a first UE detects UE IDs for one or more other UEs operating in or around a (network) area in which the first UE is operating. For example, the first UE may detect UE IDs for one or more same-cell and/or other-cell UEs. The method includes receiving an HS-SCCH transmission targeted to another UE, decoding the received second part to obtain decoded second part values, which are assumed by the first UE for purposes of UE ID detection processing to correctly represent the second part contents.

The method continues with using the decoded second part values to extract a set of UE ID hypotheses from the received CRC. This extraction is based on the first UE using the decoded second part values taken in combination with respective first part content hypotheses taken from a known set of possible first part contents. In a non-limiting example, because the first UE knows the masking function used to mask the received CRC with the unknown UE ID being detected, the first UE generates a candidate (unmasked) CRC value for each one in a set of known possibilities for the contents of the received first part. These candidate CRC values represent the possible values for the unmasked value of the received CRC, and the method includes the first UE using its knowledge of the masking function along with each candidate CRC and the masked, received CRC, to extract a UE ID hypothesis from the received CRC for each candidate CRC.

The method continues with unmasking the received first part using each extracted UE ID hypothesis to obtain corresponding unmasked values and decoding the unmasked values to obtain a decoding result corresponding to each of one or more of the extracted UE ID hypotheses. The first UE thereby obtains a decoding result for each such extracted UE ID hypotheses. In accordance with the method, the first UE evaluates the decoding results to determine whether a UE ID has been successfully detected. That evaluation involves, for example, comparing the decoding result obtained for any one of the UE hypotheses with the corresponding first part hypothesis used to extract that UE hypothesis. If they match then the UE ID is considered detected. Additionally, or alternatively, each decoding result can be tested to see if it exceeds a defined decoding quality threshold. When such condition is met, the method according to such embodiments includes identifying the extracted UE ID hypothesis corresponding to the decoding result having a highest decoding quality as a detected UE ID and storing the detected UE ID.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 5 is another block diagram of another embodiment of UE ID detection processing and corresponding processing results, as taught herein for implementation by a UE.

FIG. 6 is a logic flow diagram of one embodiment of a method of UE ID detection, as implemented by a UE.

DETAILED DESCRIPTION

Figure 1:
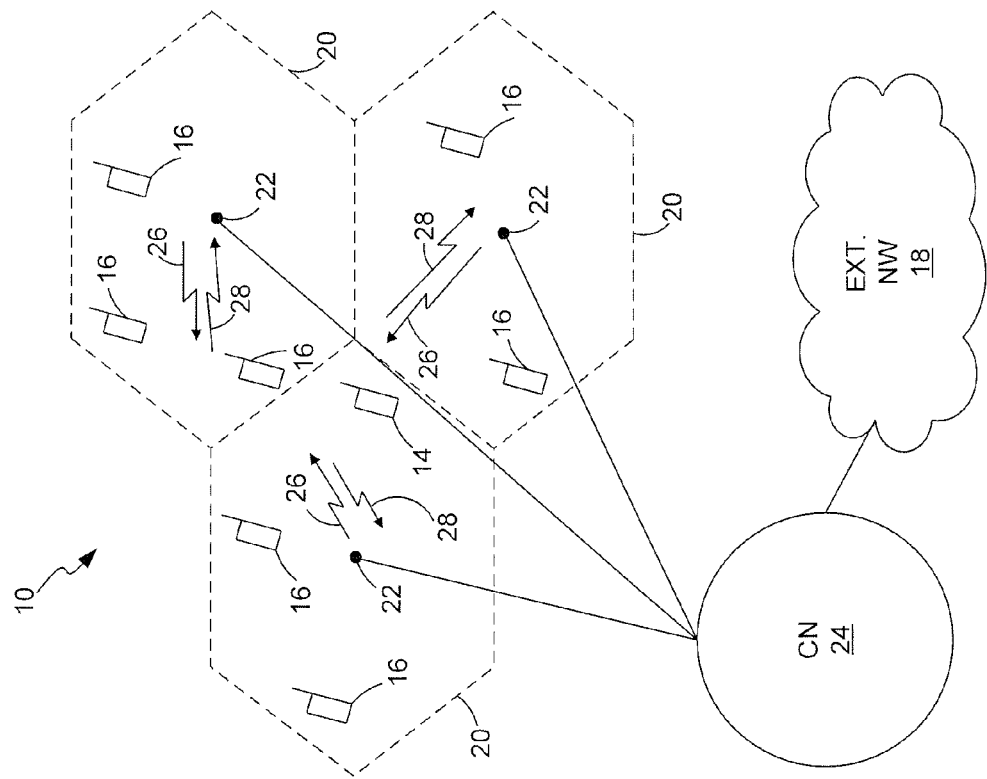
FIG. 1 is a block diagram of a wireless communication network, including one or more user equipments (UEs) that are configured according to an embodiment of the present invention.

By way of non-limiting example, FIG. 1 illustrates a wireless communication network 10, hereafter referred to simply as "network 10." The network 10 communicatively couples items of user equipment 14 and 16 to each other and/or to communication devices or systems in one or more external networks 18. In this document, the term "user equipment" is abbreviated in singular form as "UE" and in plural form as "UEs," and it should be understood that the term broadly connotes essentially any type of wireless communication apparatus, including by way of example and not limitation: cellular handsets, including feature phones, smart phones and wireless pagers, as well as any type of personal computing device with wireless communication capabilities, network adaptors, cellular modems, etc.

The UE 14 may or may not differ from UEs 16 in terms of circuit configurations and operational behaviors. However, in the context of FIG. 1, one or more of the illustrated UEs is configured to perform UE identity (ID) detection as advantageously taught herein. Thus, as a convenient example, it is assumed that the UE 14 is configured to detect the UE IDs of unknown other UEs 16 operating in or around the same area as the UE 14. It may be that one or more of the UEs 16 are similarly configured to detect UE IDs but is sufficient to discuss the configuration and operation of the UE 14 in relation to the other UEs 16.

In particular, the UE 14 is shown operating within a service area "covered" by a "cell" 20 of the network 10. As a non-limiting example, each cell 20 may be regarded as a coverage or service area of the network 10, for a given carrier frequency. It will be understood that while not explicitly shown, some or all of the cells 20 may overlap. Further, while there may be multi-sector base stations, the simplified example illustration assumes that one base station 22 serves each cell 20. In at least one embodiment, the network 10 is a WCDMA/HSPA or HSPA+ network, and the base stations 22 are nodeBs, according to the nomenclature of the WCDMA standard.

As will be understood, the base stations 22 each include radiofrequency communication circuitry (transceivers) for transmitting signals to and receiving signals from the UEs 14 and 16. In one or more embodiments, each base station 22 operates as a "serving" base station with respect to individual ones of the UEs 14 and 16, and in this regard each UE 14 or 16 generally receives a "composite" signal, which includes desired signal components from its serving base station, and one or more interfering signal components, arising for example from coincident transmissions by one or more "neighboring" base stations 22 and/or by other UEs.

With the above arrangement, the base stations 22 provide "air interface" communication links with the UEs 14 and 16. In particular, the base stations 22 each make downlink transmissions 26 and receive uplink transmissions 28. (The base stations 22 also may have additional communication interfaces supporting inter-base station communications.) The base stations 22 thus communicatively couple the UEs 14 and 16 to each other and/or to other communication devices or systems, via their communicative linking to a core network (CN) 24. As will be appreciated by those of ordinary skill in the art, the CN 24 includes a number of management, communication, and control entities, including, for example: mobility management entities, packet gateways, authentication/authorization servers, etc. Among its various functions, the CN 24 communicatively links the UEs 14/16 to the external network(s) 20.

Continuing with the WCDMA/HSPA example of the network 10, the base stations 22 make High-Speed Shared Control Channel (HS-SCCH) transmissions, with each such transmission targeted to a particular UE 14 or 16.

Figure 2:
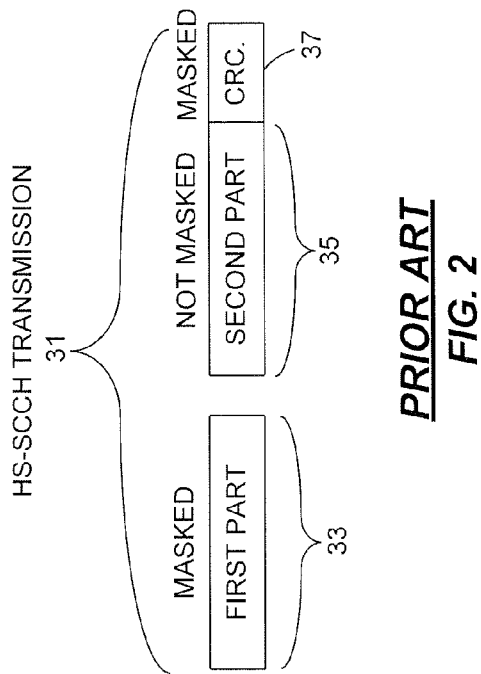
FIG. 2 is a diagram of a known message format used for High Speed Shared Control Channel (HS-SCCH) transmissions in a WCDMA/HSDPA embodiment of the network of FIG. 1.

As is known, and as is shown in FIG. 2, an HS-SCCH transmission 31 includes two parts: Part 1 labeled "33" and Part 2 labeled "35." Each HS-SCCH transmission 31 also includes a CRC 37, which generally is considered as belonging to the Part 2 portion of the HS-SCCH transmission 31 but here is shown explicitly for clarity of discussion. As TS 25.212 explains, the first part 33 of each HS-SCCH transmission 31 is masked by the UE ID of the particular UE 14 or 16 targeted by the HS-SCCH transmission 31. That is, each HS-SCCH transmission 31 targets a specific UE 14 or 16, and does so by masking the first part 33 and the CRC 37 with the unique UE ID of the targeted UE 14 or 16. The second part 35 is not masked, but it is functionally related to the first part 33 in that the unmasked value of the received CRC 37 depends on the contents (decoded values) carried in the first part 33 and in the second part 35. The unmasked value of the received (masked) CRC 37 may be regarded as the actual CRC, for use in decoding verification.

As described in the background section of this document, each HS-SCCH transmission 31 provides the targeted UE 14 or 16 with signal structure and transport format information for a corresponding data transmission targeting the UE 14 or 16 on the High Speed Physical Downlink Channel (HS-PDCH). In particular, the first part 33 identifies the modulation order, the channelization code allocations, MIMO rank, etc., while the second part 35 identifies transport format parameters needed for decoding, such as transport block size, etc. Thus, each UE 14 or 16 uses HS-SCCH transmissions 31 to properly receive corresponding data transmissions made on the HS-PDCH.

Notably, the HS-PDCH transmission made by one base station 22 at any given time may partly or fully overlap in time with the HS-PDCH transmission made by another one of the base stations 22—e.g., the two base stations 22 in neighboring cells 20 may make separate HS-PDCH transmissions at the same time, and these transmissions may interfere with each other from the perspective of one or both of the UEs 14 or 16 separately targeted by the respective HS-PDCH transmissions. For example, referring again to FIG. 1, assume that the serving base station 22 of UE 14 makes an HS-PDCH transmission to the UE 14 while a base station 22 in a neighboring cell 20 make an HS-PDCH transmission to a UE 16 served in that neighboring cell 22. From the perspective of the UE 14, the neighbor-cell HS-PDCH transmission may cause significant interference.

In at least one embodiment herein, the UE 14 is configured to detect the UE ID of that other UE 16, and to use the detected UE ID to improve its own channel estimation operations and/or to cancel interference caused by the interfering HS-PDCH transmission to that other UE 16. For example, by detecting the otherwise unknown UE ID of the other UE 16, the UE 14 is thereby enabled to "eavesdrop" (i.e., receive and properly decode) an HS-SCCH transmission 31 to the other UE 16, and in turn obtain from proper decoding of that HS-SCCH transmission 31 the specific signal structure of a corresponding HS-PDCH transmission targeting the other UE 16. That knowledge allows the UE 14 to perform, e.g., structured interference cancellation with respect to interference that arises at the UE 14 with respect to that corresponding HS-PDCH transmission targeting the other UE 16.

Figure 3:
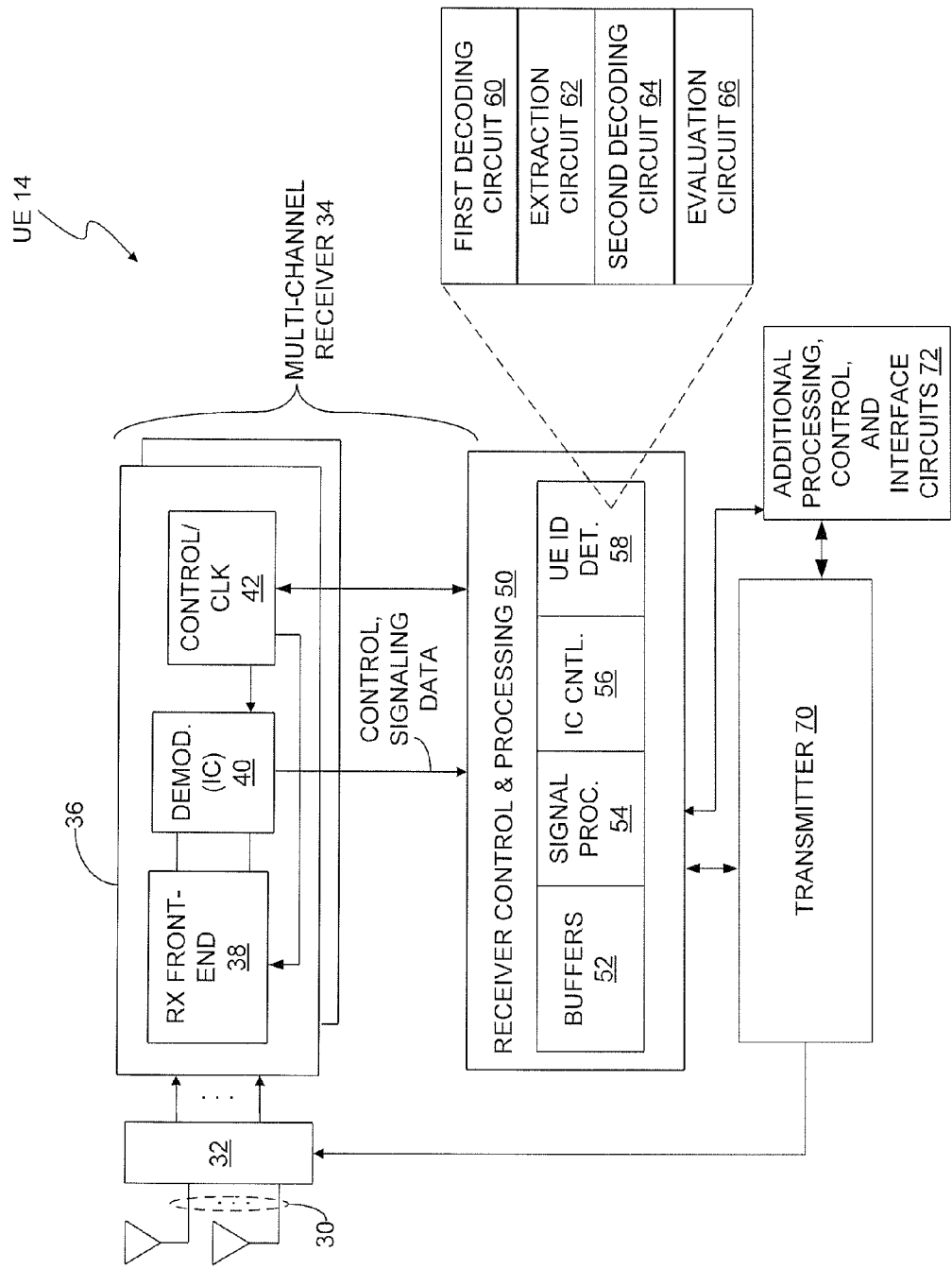
FIG. 3 is a block diagram of one embodiment of a UE that is configured to carry out UE ID detection with respect to other UEs operating in or around the same network area.

By way of non-limiting example, FIG. 3 illustrates a configuration of the UE 14 in one embodiment, where the UE 14 is configured to detect UE IDs for one or more other UEs 16, and to advantageously use the detected IDs in one or more aspects of its received signal processing. It will be appreciated that other functional and/or physical circuit arrangements may be used to carry out the disclosed UE ID detection and related processing. It will further be appreciated that the UE 14 in one or more embodiments includes one or more DSPs, microprocessors or microcontrollers, and/or other digital processing circuitry. As such, the UE 14 in at least one embodiment is at least partly configured to carry out the UE ID detection and related processing herein, based on execution of stored computer program instructions by one or more of such digital processors. The computer program instructions in such embodiments are stored, e.g., in non-volatile memory or other computer readable medium within the UE 14.

With that in mind, the illustrated UE 14 comprises one or more antennas 30—in at least one embodiment the UE 14 includes at least two antennas 30 for diversity and/or MIMO operation. The antenna(s) 30 operate as transmit/receive antenna(s) and are coupled through a switch (and/or filter block) 32 to a multi-channel receiver 34, which allows the UE 14 to simultaneously receive and process incoming antenna-received signals. This arrangement allows the UE 14, for example, to receive the HS-SCCH transmissions from its serving cell 22, while monitoring for and/or receiving the HS-SCCH transmissions in at least one neighboring cell 22.

The multi-channel receiver 34 includes two or more received-signal processing chains 36, including a receiver front-end 38, a demodulator 40, which is configured to perform structured-signal interference cancellation, and control/clocking circuits 42. The demodulator 40 provides detected symbols comprising received data and/or control signaling to receiver control and processing circuits 50, for decoding and processing. These circuits 50 at least functionally include one or more signal buffers 52, a signaling processor 54, an interference-cancellation (IC) controller 56, and a UE ID detection circuit 58.

The buffer(s) 52 store received signal samples e.g., detected symbols for processing and allows the UE 14 to buffer signal samples that may correspond to HS-SCCH transmissions 31, for example. The signaling processor 54 interprets and processes control signaling directed to the UE 14, including HS-SCCH transmissions 31 targeting the UE 14, while the IC controller 56, which may not be included in one or more embodiments, provides the option of performing IC on a conditional (selective basis). Finally, the UE detection circuit 58 performs UE ID detection as taught herein.

The UE 14 further includes a transmitter 70, for transmitting uplink signals to the network 10, and, as will be appreciated by those of ordinary skill in the art, the UE 14 generally also includes additional processing, control, and/or interface circuits 72. The nature of such additional circuitry depends on the intended use and/or features of the UE 14. For example, in a network modem embodiment, the UE 14 may include USB or other communication interfaces, for connection to a laptop or other computer, while in a cellular handset embodiment the UE 14 may include a display screen, speakers, keyboard/touchscreen, etc.

Broadly, FIG. 3 may be understood as providing an example illustration for the UE 14, which for convenience also may be referred to as a "first UE," operating in an area with one or more other UEs 16 ("second UEs") operating in the same area or around the same area—e.g., in the same serving cell 20 as the first UE and/or in one or more neighboring cells 20. The UE 14 comprises in an example embodiment a wireless communication transceiver (multi-channel receiver 34 and the transmitter 70) configured to send and receive wireless signals, including receiving a High Speed Shared Control Channel (HS-SCCH) transmission 31 targeted to another UE 16.

That HS-SCCH transmission 31 includes a first part 33 that is masked with the UE ID of the other UE 16, a second part 35 that is not masked, and a Cyclic Redundancy Check (CRC) 37 that is masked. As explained, the CRC is computed (at the remote transmitter originating the HS-SCCH transmission 31) over first part contents encoded in the first part 33 and second part contents encoded in the second part 35.

Figure 4:
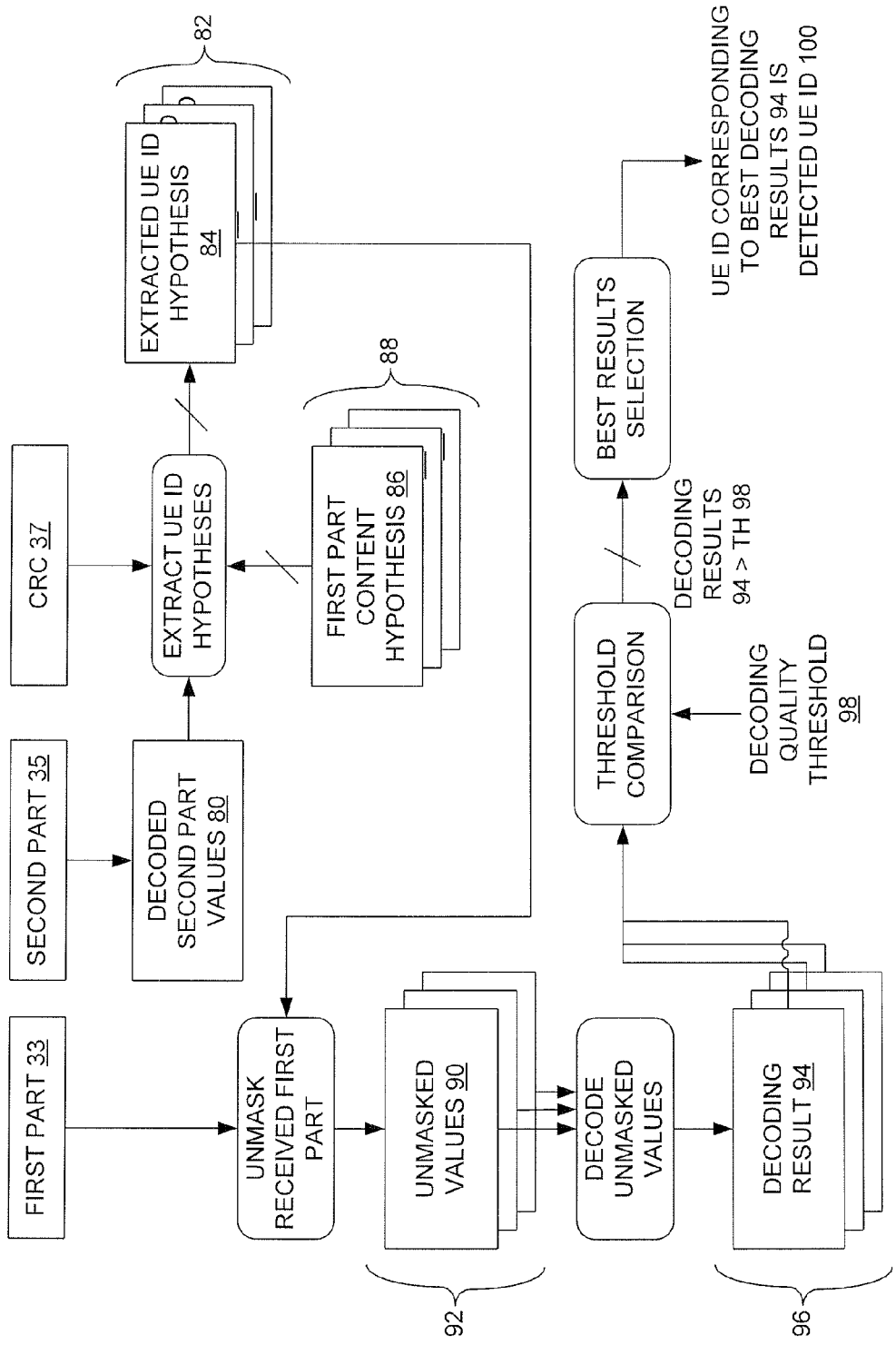
FIG. 4 is a block diagram of processing operations and corresponding processing results, for an example implementation of UE ID detection as taught herein for implementation by a UE.

With reference to both FIGS. 3 and 4, the UE 14 further includes one or more processing circuits 58 operatively associated with the wireless communication transceiver 34, 70, and configured to: decode the received second part 35 to obtain decoded second part values 80, which are assumed by the UE 14 for purposes of UE ID detection processing to correctly represent the actual second part contents; extract a set 82 of UE ID hypotheses 84 from the received CRC 37, using the decoded second part values 80 taken in combination with respective first part content hypotheses 86 taken from a known set 88 of possible first part contents; unmask the received first part 33 using each extracted UE ID hypothesis 84 to obtain corresponding unmasked values 90, thereby obtaining a set 92 of unmasked values 90 for the corresponding set 82 of extracted UE ID hypotheses 84; decode the unmasked values 90 to obtain a decoding result 94 corresponding to each extracted UE ID hypothesis 84, thereby obtaining a set 96 of decoding results 94 corresponding to the set 82 of extracted UE ID hypotheses 84; and evaluate the set 96 of decoding results 94 for UE ID detection.

In one or more embodiments, each decoding result 94 comprises a Viterbi decoder output sequence, which is then compared to the first part content hypothesis 86 that was used to construct the UE ID hypothesis 84 for this decoding instance. If they match, the decoding result 94 is marked as successful and its decoding quality metric is computed. If more than one successful decoding result 94 is found, the one with the best metric is identified as a detected UE ID 100. In a simplified embodiment of this approach, metric computation is omitted and the first successfully decoded candidate is identified as corresponding to a detected UE ID 100.

Advantageously, the UE 14 in one or more embodiments is configured so that it does not completely decode the unmasked values 90 corresponding to each UE ID hypothesis 84. Instead, it "breaks" or aborts decoding processing as soon as the most recent output bit from decoding does not match the hypothesis sequence. So, for fifty-percent of the UE ID hypotheses 84, the UE 14 decodes only to the first committed output bit, decodes to two bits for 25% of them, decodes to three bits for 12.5% of them, etc.

Such advantageous processing efficiency is based on the recognition that the only possible successful outcome from the decoding process is the first part content hypothesis 86 that was used to construct the corresponding UE ID hypothesis 84. Therefore the decoding process may be aborted as soon as deviations from the hypothesized sequence are detected. Only very few hypotheses need to be run close to the end. Such operation results in a dramatically lower decoding load for the detection process.

To provide additional robustness in the evaluation of the decoding results 94, at least one approach to evaluation contemplated herein assesses the decoding quality of each decoding result 94, such as by comparing its decoding metrics to a decoding quality threshold 98. There may be more than one decoding result 94 from the set 96 of decoding results 94 that satisfies the threshold test. Identifying the best one among them can be performed by comparing the decoding metrics for all of the decoding results 94 that exceeded the decoding quality threshold 98, to identify the decoding result 94 with the largest metric exceeding the decoding quality threshold 98. The threshold 98 may be determined by fully decoding a small number of additional hypotheses to gather decoding metrics corresponding to unsuccessful candidates, or by deriving the threshold based on the input signal quality into the Viterbi decoder.

Note that with some low probability, decoding may produce an output sequence matching one of the first part content hypotheses 84, even when that content was not present in the received signal. Thus, the threshold testing option provides additional protection against false UE ID detection by determining whether any of the decoding result 94 exceeds the defined decoding quality threshold 98 and when such condition is met, identifying the extracted UE ID hypothesis 84 corresponding to the decoding result 94 having a highest decoding quality as a detected UE ID 100 and store the detected UE ID 100.

In at least one embodiment, shown specifically in FIG. 3, the processing circuit(s) 58 at least functionally include a first decoding circuit 60 configured to decode the received second part 35, a UE ID extraction circuit 62 configured to obtain said set 82 of extracted UE ID hypotheses 84, a second decoding circuit 64 configured to obtain the set 96 of decoding results 94 corresponding to the set 82 of extracted UE ID hypotheses 84, and an evaluation circuit 66 configured to detect UE IDs 100 and to store said detected UE IDs 100. In this regard, the evaluation circuit 66 will be understood to detect UE IDs 100 from the decoding results 94 obtained for given HS-SCCH transmissions 31 received by the UE 14.

In at least one embodiment, and with joint reference to FIGS. 3 and 4, the processing circuits 50 use a detected UE ID 100 to decode information from an HS-SCCH transmission 31 that is targeted to the other UE 16 having the detected UE ID 100, where that HS-SCCH transmission 31 is also received by the UE 14. By using the correct UE ID 100 for processing such an HS-SCCH transmission 31, the UE 14 identifies the data signal structure for the other UE 16, from the decoded information obtained from the HS-SCCH transmission 31. In other words, the UE 14 in at least one embodiment detects the UE ID 100 of a given other UE 16, based on receiving a first HS-SCCH transmission 31 targeting that other UE 16, and then it uses that HS-SCCH transmission 31 or a subsequent (later) HS-SCCH transmission 31 targeting that same other UE 16, to discover the signal structure that is being used, or will be used, for making an HS-PDCH data transmission to the other UE 16. Thus, to the extent that that HS-PDCH data transmission causes reception interference at the UE 14, the UE 14 can, for example, perform structured-signal interference cancellation on that interference, using its knowledge of the signal structure used for making that interfering HS-PDCH transmission to the other UE 16.

In the same or another embodiment, the one or more processing circuits 50 of the UE 14 are configured to use a detected UE ID 100 to eavesdrop on one or more HS-SCCH transmissions 31 to the other UE 16 (corresponding to the detected UE ID 100), and further to use decoded information obtained from said eavesdropping to perform at least one of: channel estimation at the UE 14 for a desired signal targeting the UE 14; and interference cancellation at the UE 14 for the desired signal.

In the same or another embodiment, the one or more processing circuits 50 are configured to dynamically detect UE IDs 100 for a changing and generally unknown set of UEs 16 that are served by one or more cells 20 covering or neighboring the area in which the UE 14 is operating. In at least one such embodiment, such as shown in FIG. 5, the processing circuit(s) 50 are configured to maintain cell-specific lists 110 of detected UE IDs 100, based on repeatedly attempting to detect UE IDs 100 in recurring intervals of time. Such lists are generally referred to as "list 110" or "lists 110" and are shown in the drawing as lists 110-1 through 110-R.

FIG. 5 provides further processing/data flow details in an example building on the details of FIG. 4. One sees that the UE ID extraction circuit 62 includes a Part 1 hypothesizer 120, which has knowledge of the possible values that can be taken on by the first part 33 of any given HS-SCCH transmission 31, and includes a UE ID extractor 122, which extracts the set 82 of UE ID hypotheses 84 shown in FIG. 4. Along these lines, the second decoding circuit 64 at least functionally includes an unmasking circuit 124 and a decoding circuit 126. The unmasking circuit 124 generates the set 92 of unmasked values 90 shown in FIG. 4, where it will be understood that each extracted UE ID hypothesis 84 is used to generate corresponding unmasked values 90. In turn, the decoding circuit 126 decodes the unmasked values 90, to obtain a decoding result 94 for the unmasked values 90 obtained from each extracted UE ID hypothesis 84. That is, there is a decoding result 94 for each one of extracted UE ID hypotheses 84.

The evaluation circuit 66 evaluates the decoding results 94 for one or more of the extracted UE ID hypotheses 84, to determine whether a UE ID has been detected. In one embodiment, the evaluation circuit 66 takes as a detected UE ID 100 the extracted UE ID hypothesis 84 that corresponds to a successful decoding result 94—i.e., the decoding result 94 that matches its corresponding first part content hypothesis 86. However, as noted earlier, there is a low but existent possibility that more than one match might be found. Thus, in at least one embodiment, the evaluation circuit 66 finds the "best" match based on the decoding quality metrics associated with the decoding results 94.

In one such case, the evaluation circuit 66 at least functionally includes a comparison circuit 128 that is configured to "filter" the decoding results 94, by comparing them to the decoding quality threshold 98, so that only those decoding results 94 that exceed (e.g., in some numeric sense) the decoding quality threshold 98 are passed along for UE ID detection processing, which is performed by an identification circuit 130. The identification circuit 130 identifies the best decoding result 94 (among those decoding results 94 that exceed the decoding quality threshold 98) as the detected UE ID 100. Here, "best" depends on the formulation used for determining the decoding quality results 94. Assuming that the formulation yields a numeric value where higher magnitudes indicate better decoding quality, the "best" decoding result 94 would be the one with the greatest value. Those skilled in the art will appreciate that other formulations may require other approaches to determining which decoding result 94 is best.

In any case, detected UE IDs 100 are stored, for example, in working memory 132 of the UE 14, for use, such as for use by the IC controller 56, which in one or more embodiments is configured to turn IC processing "on" and "off" at the demodulator 40 (see FIG. 3), or to otherwise conditionally control IC processing by the demodulator 40, based on measured signal strength, for example, such as provided by a signal strength measurement circuit 134 in the UE 14. Additionally, or alternatively, IC processing may be conditioned on one or more other dynamically evaluated parameters that indicate directly or indirectly the usefulness of such IC processing. As an example, if the other-cell transmissions are weak (e.g., below a defined other-cell signal strength threshold), then the interference arising from HS-PDCH transmissions to UEs 16 in those other cells will be relatively low and IC processing is not needed. Similarly, whether to perform IC processing may be conditioned on measured signal quality (for desired signal reception) at the UE 14, such as may be expressed in SNR or SINR values (dB).

In any case, in at least one embodiment, the UE 14 performs UE ID detection and related processing with respect to repeating intervals of time. In any given interval, the UE 14 performs interference cancellation processing at the UE 14 with respect to one or more candidate UEs 16 represented in the cell-specific lists 110 of detected UE IDs 100. That is, the UEs 16 represented by detected UE IDs 100 stored in the one or more of the lists 110 are candidates for use, but not all such listed UEs 16 necessarily are used. For example, the UE 14 may choose to detect HS-SCCH transmissions 31 using the UE ID(s) 100 of only one or a subset of the UEs 16 represented in the list(s) 110. Such selectivity may be based on, e.g., measuring cell signal strength and performing such processing only for UEs 16 that are operating in the strongest cell(s) 20.

Assuming that interference processing is performed by the UE 14, the one or more processing circuits 50 perform such interference cancellation processing based on being configured to: use the detected UE ID 100 of each candidate UE 16 to decode a HS-SCCH transmission 31 to the candidate UE 16 (the same or a subsequent one); determine from that decoded HS-SCCH transmission 31 a signaling structure to be used for a data transmission to the candidate UE 16; and cancel interference in a desired signal received at the UE 14 that arises from the data transmission to the candidate UE 16, using knowledge of the signaling structure.

Thus, in at least one embodiment the one or more processing circuits 50 are configured to perform interference cancellation processing on a conditional basis, in dependence on evaluating at least one of: received signal strengths at the first UE 14 with respect to one or more cells 20 associated with one or more of the UEs 16 represented in the cell-specific lists 110 of detected UE IDs 100; and numeric values maintained in the cell-specific lists 110 in conjunction with the detected UE IDs 100. These numeric values each reflect one or more of the number of times the corresponding UE ID 100 has been detected, the number of times the corresponding UE ID 100 has been used in prior performances of interference cancellation at the UE 14, and a relative signal strength at the UE 14 for the serving cell 20 of the UE 16 associated with the corresponding UE ID 100. In other words, for each UE ID 100 stored in the list(s) 110, the UE 14 is in one or more embodiments configured to store one or more associated numeric values that are used by the UE 14 in determining how useful it will be to use the UE ID 100 in its UE ID related received signal processing.

In at least one embodiment, the recurring intervals of time are Transmission Time Intervals (TTIs), and the one or more processing circuits 50 are configured to attempt detection of UE IDs 100 on a recurring basis across repeating TTIs.

Of further note, any given base station 22 generally will use only a limited number of possible transmission formats for making HS-SCCH transmissions 31, meaning that there is a defined "search space" that the UE 14 need search when it is monitoring for HS-SCCH transmissions 31 transmitted in neighboring cells 20 to other UEs 16. Correspondingly, in one or more embodiments, the processing circuit(s) 50 are configured to detect UE IDs 100 for a dynamically changing and unknown set of UEs 16 that are operating in or around the area in which the UE 14 is operating.

Thus, in at least one embodiment, the processing circuits 50 are configured to define a set of candidate HS-SCCH transmission formats based on known combinations of coding channels and physical layer transmission formats that are defined for making HS-SCCH transmissions 31 according to the standards and/or protocols of the network 10. Such functionality is based on the one or more processing circuits 50 of the UE 14 being configured to: for each candidate in a set of candidate HS-SCCH transmission formats, receive a putative HS-SCCH transmission 31 and attempt to detect a valid UE ID 100 from that putative HS-SCCH transmission 31, and to store any detected UE IDs 100 in one or more lists 110 that are maintained in a memory 132 of the UE 14.

As an example, the UE 14 buffers an antenna-received signal corresponding to given channelization codes and transmission formats that are known or otherwise defined for use in making HS-SCCH transmissions 31 in a given neighboring cell 20. Now, the UE 14 may not know with certainty that the buffered signal samples represent an actual HS-SCCH transmission 31, but it does know that such samples potentially correspond to such a transmission. Thus, by processing such samples—e.g., carrying out the processing flow of FIG. 4—the UE 14 may detect a UE ID 100 from the transmission. In this manner, over time, the UE 14 receives, buffers, and processes multiple putative HS-SCCH transmissions 31, in an attempt to detect UE IDs 100 for any number of other UEs 16 operating around the UE 14. According to such processing, the one or more processing circuits 50 are configured to store any detected UE IDs 100 in the one or more lists 110. In particular, the processing circuits 50 may be configured to maintain the lists 110 as cell-specific lists of detected UE IDs 100.

Further, in at least one embodiment, the processing circuits 50 are configured to repeatedly attempt detection of UE IDs 100, and to correspondingly refresh the one or more lists 110 on a repeating basis. For example, the processing circuits 50 are configured to refresh the one or more lists 110 on a repeating basis based on being configured to perform at least one of: adding newly detected UE IDs 100 to the one or more lists 110 (e.g., on a cell-specific basis); and deleting stale detected UE IDs 100 from the one or more lists 110. Previously detected UE IDs 100 may be identified as being stale responsive to determining that a given detected UE ID 100 has not been re-detected in n most recent detection attempts by the UE 14, where n is an integer value greater than or equal to one. Thus, a UE ID 100 may be detected in a given interval and put into the list(s) 110, and then later removed from the list(s) unless it is redetected.

Without reference to any particular circuit architecture, the UE 14 will be understood as being, in one or more embodiments, configured to carry out a method 140 such as shown in FIG. 6. The method 140 in at least one embodiment is wholly or at least partly implemented in digital processing circuitry of the UE 14 (e.g., the processing circuits 50), based on their execution of stored computer program instructions. Also, it will be understood that one or more steps of the method 140 may be carried out in an order other than that illustrated. Additionally, or alternatively, one or more steps of the method 140 may be carried in parallel and/or as part of other processing operations at the UE 14. In at least one embodiment, the method 140 is repeated in successive time intervals and/or is carried out on an ongoing or background basis, so that the UE 14 dynamically detects one or more UE IDs 100 of a generally unknown and dynamically changing set of UEs 16 operating in or around the same area as the UE 14.

The method 140 includes receiving (step 142) an HS-SCCH transmission 31 targeted to another UE 16, wherein the HS-SCCH transmission 31 includes a first part 33 that is masked with the UE ID 100 of the other UE 16, a second part 35 that is not masked, and a CRC 37 that is masked. The CRC 37 is computed over first part contents encoded in the first part 33 and second part contents encoded in the second part 35.

The method 140 further includes decoding (step 144) the received second part 35 to obtain decoded second part values 80, which are assumed to correctly represent the second part contents. Further, the method 140 includes extracting (step 146) a set 82 of UE ID hypotheses 84 from the received CRC 37 using the decoded second part values 80 taken in combination with respective first part content hypotheses 86 taken from a known set 88 of possible first part contents.

Still further, the method 140 includes unmasking (step 148) the received first part using each extracted UE ID hypothesis 84 to obtain corresponding unmasked values 90. Additionally, the method 140 includes and at least partially decoding the unmasked values 90 for one or more of the extracted UE ID hypotheses 84, to obtain a decoding result 94 for each of the one or more extracted UE ID hypotheses 84, and evaluating (step 150) the decoding results 94 to determine whether one of the extracted UE ID hypothesis 84 is a detected UE ID 100 and, if so, storing the detected UE ID 100.

In one example, such evaluating comprises determining whether any of the decoding results 94 exceeds a defined decoding quality threshold 98 and, when such condition is met, identifying the extracted UE ID hypothesis 84 corresponding to the decoding result 94 having a highest decoding quality as the detected UE ID 100 and storing the detected UE ID 100. In another example, such evaluating comprises identifying a first one of the one or more extracted UE ID hypotheses 84 that yields a successful decoding result 94 from the corresponding unmasked values 90.

Thus, in one embodiment of a UE-based processing method, the UE IDs and signaling configuration for other-cell UEs 16 is determined via the following steps: (1) define a set of candidate HS-SCCH channelization codes (CCs) and transmit formats (transmit diversity mode) combinations; (2) for each candidate combination, receive a putative (possible) HS-SCCH transmission 31 and decode the second part 35 and generate candidate CRCs for a set 88 of possible part 1 contents 86 combined with the decoded part 2 contents 80; (3) for each such candidate CRC, the UE 14 extracts a UE ID hypothesis by adding (modulo 2) the candidate CRC to the received CRC 37, which is carried as the last sixteen bits in the second part 35 of the HS-SCCH transmission 31; (4) unmask the received first part 33 using each UE ID hypothesis 84 to obtain corresponding unmasked values 90; (5) decode the unmask values 90 corresponding to each UE ID hypothesis 84—e.g., in a Viterbi decoding process; (6) evaluate the decoding results 94 to find the UE ID hypothesis 84 resulting in successful decoding; and (7) and store that UE ID hypothesis 84 as a detected UE ID 100. In at least one embodiment, Steps (6) and (7) are made more robust through use of a defined decoding quality threshold 98. In such embodiments, "successful" decoding results 94 are compared by a comparison circuit 128 against a decoding quality threshold 98; if any exceed that threshold, an identification circuit 130 chooses the best decoding result 94 among those satisfying the threshold. The UE ID hypothesis 84 corresponding to the best decoding result 94 is taken as a detected UE ID 100.

In at least one embodiment, the UE 14 keeps one or more lists 110 of detected UE IDs 100, along with the CC and transmit diversity (Tx-div) mode information corresponding to the HS-SCCH transmission 31 from which each UE ID 100 was detected. Such information can be used to facilitate subsequent attempts to detect the same UE IDs 100, and such information may be maintained on a per-cell basis and updated over time. The list(s) 110 may be used by the UE 14 to eavesdrop on HS-SCCH transmissions 31 in a neighbor cell 20, which thereby allows the UE 14 to extract HS-PDSCH signal structure (modulation and coding scheme, or MCS) information for other UEs 16. That information in turn may be used, for example, to configure the IC function in the demodulator 40 of the UE 14 to mitigate interference from HS-PDCH transmissions in a neighbor cell 20.

In general, the particular cell configurations for neighbor cells 20 are initially unknown to the UE 14. The UE 14 thus loops through a predetermined set of CCs to locate the HS-SCCH information in each of one or more neighbor cells 20. Usually, every base station manufacturer allocates the HS-SCCH on a limited set of possible CCs, which means that in practice around five different channelization codes need to be looped over by the UE 14. Of course, the UE 14 also may extend its search for HS-SCCH transmissions 30 by looping over the possible channelization codes first assuming that Space-Time-Transmit-Diversity is used for HS-SCCH transmissions 31, and then assuming that no TX-div is used. The UE 14 may further extend the HS-SCCH transmission search space by looking for HS-SCCH transmissions of Type 1, 2, or 3, where those types are predefined and known to the UE 14.

In many scenarios, it may be assumed that, in a given cell 20 of the network 10, all UEs 16 served by that cell 20 are configured with the same Tx-div state and that the HS-SCCH code allocation is constant, or at least changes rarely. Thus, after identifying some UEs 16 from a given cell 20, the UE 14 may limit its HS-SCCH transmission search space for that cell 20 to the already detected Tx-div state and CC allocation. For every relevant Tx-div mode, CC allocation, and HS-SCCH type combination, the UE 14 receives and buffers a putative HS-SCCH transmission 31 and performs UE ID detection processing as previously described herein, and which is shown in further example detail in FIG. 7.

Figure 7:
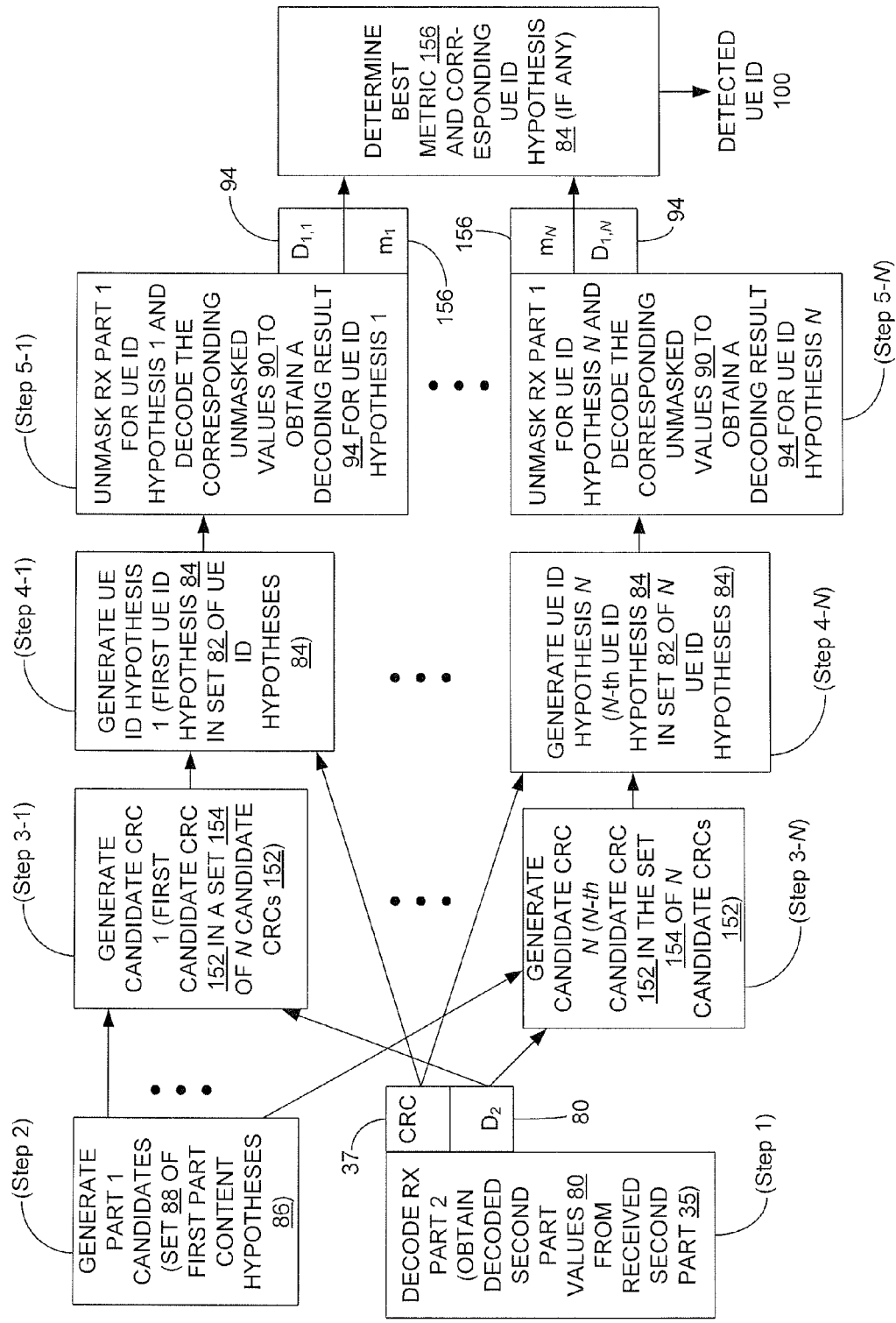
FIG. 7 is a block diagram providing further details for UE ID detection processing by a UE, and its details may be understood as representing an embodiment of the processing more generally depicted in FIGS. 4 and 5.

According to FIG. 7, the UE 14 (Step 1) decodes the second part 35 and assumes that the decoded second part values 80 are correct; (Step 2) generate a set 88 of first part content hypotheses 86, based on a known set 88 of possible first-part contents; (Step 3-1 . . . 3-N) for every combination of the decoded second part values 80 (denoted as "$D_2$" in the diagram) with a first part content hypothesis 86, generate a corresponding candidate CRC 152, to thereby obtain a set 154 of candidate CRCs 152; (Step 4-1 . . . 4-N) for every candidate CRC 152, extract a corresponding UE ID hypothesis 84 from the received CRC 37—assuming, as the UE 14 does, that its part-2 decoding is done correctly, each one of the UE ID hypotheses 84 is retrieved by adding a respective one of the candidate CRCs 152 to the received CRC 37, modulo 2; and (Step 5-1 . . . 5-N) decode the received first part 33, as unmasked using each one of the UE ID hypotheses 84. That is, the received first part 33 is unmasked using each UE ID hypothesis 84, to obtain corresponding unmasked values 90, which are then decoded to obtain a corresponding decoding result 94—denoted in FIG. 7 as $D_{1,1}$ for the first UE ID hypothesis 84, $D_{1,2}$ for the second UE ID hypothesis 84, and so on.

Further, as will be understood, each decoding result 94 has an associated decoding metric 156, denoted as $m_1$ for the first decoding result 94, $m_2$ for the second decoding result, and so on. In one or more embodiments, evaluating the decoding results 94 comprises evaluating their decoding metrics 156. In one example, the decoding metrics 156 are Viterbi metrics resulting from Viterbi decoding of the unmasked values 90 corresponding to each one in the set 82 of UE ID hypotheses 84. If one UE ID hypothesis 84 yields a significantly better part 1 decoding metric 156 than the others, the UE 14 accepts it as a detected UE ID 100. Of course, successfully detecting the UE ID 100 also gives the UE 14 the actual contents of the first part 33. It will be understood that at least some of the illustrated steps in FIG. 7 may be performed in a different order or be performed together, etc.

Notably, in at least one embodiment of the UE 14, if all decoding results have decoding quality metrics 156 of similar size (corresponding to the noise floor), then the UE 14 decides that no UE ID has been detected. Additionally, or alternatively, if none of the decoding quality metrics exceeds the defined decoding quality threshold 98, the UE 14 decides that no UE ID has been detected. (Looping through Type 2 HS-SCCH processing can be omitted, because it relates to HS—less operation and therefore usually does not cause large data flows and significant interference.) In one embodiment, determining whether one of the Viterbi metrics—decoding quality metrics for the set 96 of the decoding results 94—is significantly better may be done based on the UE 14 finding the maximum metric index, $i_{max}$) computing the mean of the rest of the metrics 156, denoted as M, and applying thresholding using a fixed or dynamically determined value for the decoding quality threshold 98.

A UE ID 100 is detected as valid if $m_{i,max}$>TM, where "T" denotes the threshold 98. The threshold T may be determined off-line or, for example, it may be a function of the received signal SINR at the UE 14. Note that the use of thresholding can be understood as establishing minimum, defined detection reliability for UE ID detection processing at the UE 14.

The set 88 of first part content hypotheses 86 may be the full set of all possible HS-SCCH Part-1 sequences, or a reduced set where illegal sequences and sequences incompatible with the given network configuration are excluded, or a further reduced set where some of the Part-1 information is blindly detected by the UE 14 (e.g. the used HS-PDSCH codes, the modulation, etc.) and the Part-1 sequences incompatible with the blindly detected characteristics are excluded.

In any case, the UE 14, in at least one embodiment, keeps a list 110 of detected UE IDs 100, each detected UE ID 100 stored with its Tx-div mode and its HS-SCCH CC allocation. Further, in at least one such embodiment, each UE ID 100 is stored with one or more numeric values serving as a quality measure or grade reflecting the likelihood that the detected UE ID 100 corresponds to a UE 16 causing substantial interference. That is, each detected UE ID 100 is stored in the list(s) 110 in association with one or more numeric values that reflect, for example, the probability or extent to which other-cell transmissions to the UE 16 represented by that detected UE ID 100 will interfere with desired-signal reception at the UE 14.

The UE ID detection processing of the UE 14 may, as previously noted, be carried out in the processing "background," spanning over several time slots. A new UE ID is not searched for until the previous detection process has finished. Searching for UE IDs could be done even if no cancellation has been activated at the UE 14 for another other cell 20.

In at least one embodiment, the UE 14 searches for UE IDs from the other cell 20 with the strongest Received Signal Code Power (RSCP). Alternatively, the power across all fifteen CCs used for HS-SCCH transmissions 31 (with spreading factor 14) is computed for the cells 20 in the active set of the UE 14 and filtered by the UE 14 over an extended period of time. The cell 20 to which the UE 14 then applies interference cancellation is then chosen based on the power across the fifteen codes. If the UE 14 is subject to processing limitations i.e., computational limits—the UE 14 may consider the TTI time alignment (NTA) between the serving cell 20 of the UE 14 and the cell 20 for which the UE 14 implements IC processing.

For example, a look-up table or a function at the UE 14 takes as input the NTA and the other cell power output for one or more neighboring cells 20, to yield a metric per cell 20. The UE 14 selects the other cell 20 with the largest metric for cancellation. For example, the per cell metric could equal (3−NTA)×cell power. For example, assume that the cells 20 are misaligned by 2 slots (NTA). Denote the cells 20 as cell 1 (serving) and cell 2 (interfering). Cell 2 TTI is overlapping 2 slots into Cell 1 TTI by assumption. Assume the UE 14 has time only to decode the first part of Cell 2 TTI that overlaps Cell 1 TTI. Then the UE 14 will at best only cancel two-thirds of Cell 2 interference from Cell 1 TTI. Thus, according to foregoing formulation, the metric becomes smaller the less the UE 14 is able to cancel.

"Selecting" another cell 20 for interference cancellation means that the UE 14 will attempt to detect one or more UE IDs from the selected cell 20, and then use any detected UE IDs 100 to decode HS-SCCH transmissions 31 to the corresponding UEs 16, to thereby determine the HS-PDCH signal structure used in the other cell 20 for HS-PDSCH transmissions to those UEs 16. In turn, the UE 14 uses its knowledge of that signal structure to perform structured-signal IC for interference arising from those HS-PDSCH transmissions in the selected cell 20. Using knowledge of the signal structure comprises, for example, performing interference cancellation based on the specific MCS used for a given HS-PDCH transmission, as discovered from decoding the corresponding HS-SCCH transmission meant for another UE 16.

The modulation structure information in Part 1 of the HS-SCCH transmission 31 targeting the other UE 16 is used by the UE 14 to configure the its despreaders, select the appropriate MIMO processing mode in the equalizer, and select the proper QAM demodulation mode. The coding structure information in Part 2 of the HS-SCCH transmission 31 targeting the other UE 16 is used by the UE 14 to configure proper transport and code block partitioning for the rate matching and Turbo decoder stages in its multi-channel receiver 34. With proper configuration, the UE 14 then correctly demodulates and decodes the HS traffic data sent to the other UE 16 in accordance with the Part 1/Part 2 structure and uses the decoded HS traffice for IC at the UE 14. In one embodiment, an estimate of the data signal transmitted to UE 16 is regenerated by the UE 14, its received signal contribution at the UE 14 is computed by applying the propagation channel as estimated by the UE 14, and the estimated received contribution is subtracted by the UE 14 from the total received signal at the UE 14.

When a new neighboring cell 20 becomes sufficiently strong, the UE 14 begins building a new list 110 (lists 110 also are referred to as "books") for it with any detected UE IDs 100 and corresponding Tx-div and CC information. For example, the UE 14 may store up to three books in memory. The UE 14 may, for example, delete stored books using a first in, first out method. In case all available books are used, a book for a new cell 20 replaces the oldest stored book, which corresponding to the cell 20 for which an associated detected UE ID 100 was used furthest back in time. The size of the book per cell generally is limited to a predefined number of detected UE IDs 100 and their associated information, e.g., no more than one hundred UE IDs 100 are stored in the book for a given cell 20. If the upper limit on book storage is reached for a given cell 20, scanning for new UE IDs in this cell is no longer done.

Multiple ways of managing the book of detected UE IDs 100 for given other cells 20 are contemplated for the UE 14.

However, a basic approach involves the UE 14 being configured to track how often a given UE ID is encountered in HS-SCCH transmissions 31 and used by the UE 14 for other-cell IC processing. The UE 14 ranks detected UE IDs 100 stored in the book accordingly, and at each TTI, the rankings are used to identify those candidate UE IDs 100 that are considered by the UE 14 as being the currently most likely subset from the book to be useful for attempting HS-SCCH decoding for the current TTI. Previously detected UE IDs 100 in the book, which are not encountered (re-detected) in HS-SCCH messages over some period of time are removed from the book.

One contemplated UE ID list management algorithm for the UE 14 is as follows. Each detected UE ID 100 in a stored book is given a grade, from one to ten; indicating how likely transmissions to the corresponding UE 16 are to cause desired-signal interference at the UE 14. The first time a given UE ID is detected and stored in the book, it is assigned a neutral grade, such as five. Detected UE IDs 100 from the list are used to attempt decoding HS-SCCH transmissions 31 in the current TTI. If a certain one of the detected UE IDs 100 results in successful HS-SCCH decoding (i.e., a previously detected UE ID 100 is re-detected in the current TTI), the corresponding UE ID grade is increased by one. Otherwise, the UE 14 decreases the grade by one.

If a detected UE ID 100 in the book is selected for interference cancellation in a given TTI, its stored grade is increased again by one. Any grade above ten is rounded down to ten. If a detected UE ID 100 in the book ends up having a grade of zero that detected UE ID 100 is dropped from the book.

Figure 8:
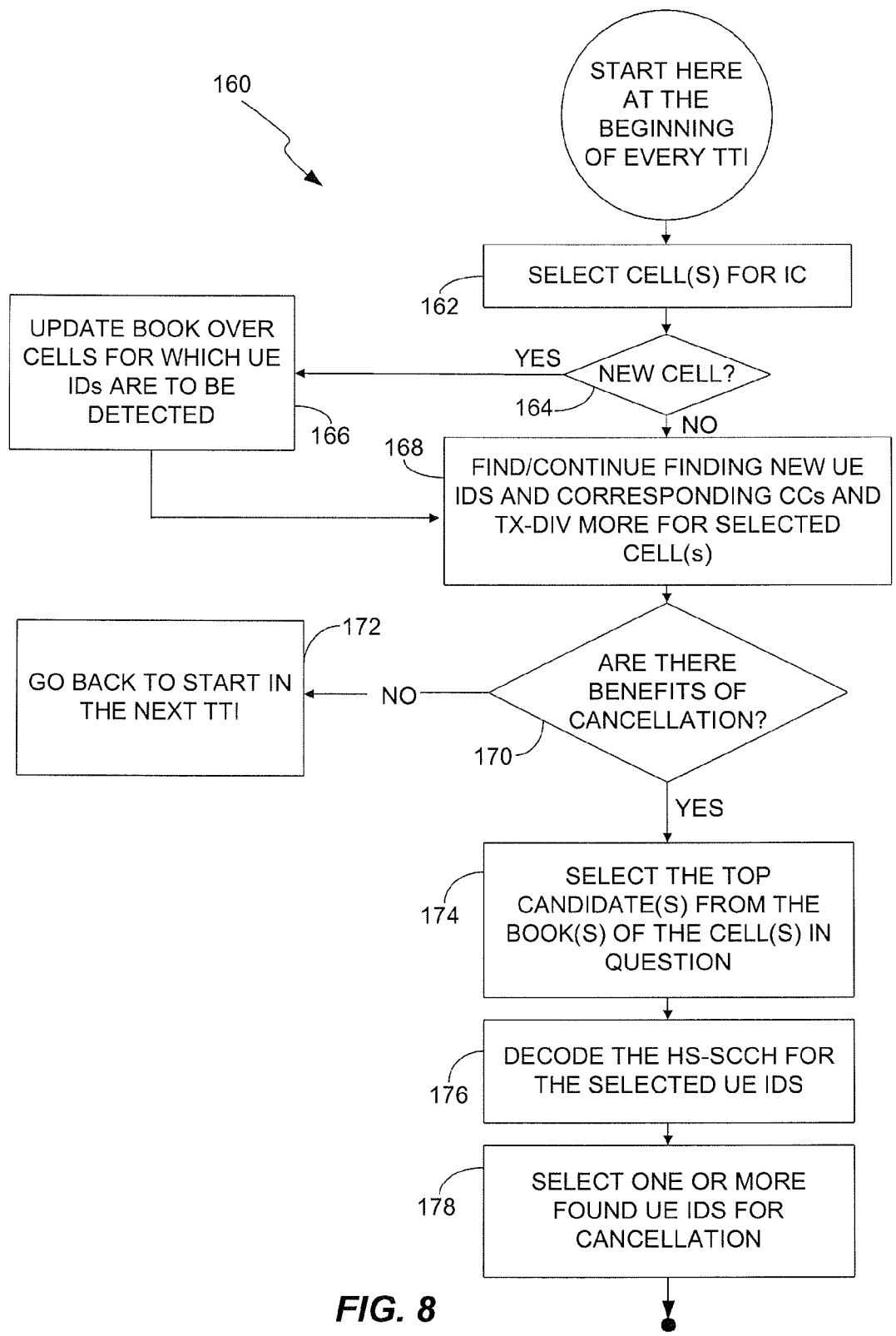
FIG. 8 is a logic flow diagram of another embodiment of a method of UE ID detection, as implemented by a UE.

The above processing is illustrated in logic flow form in FIG. 8 as a method 160. The method 160 may be understood as an elaboration or variation of the earlier method 140, and it is performed every TTI and "begins" with the UE 14 selecting one or more neighboring cells 20 for interference cancellation processing (162). As noted, the selection may be based on evaluating per-cell signal strengths at the UE 14. If a selected cell 20 is a new cell (Yes from 164), processing continues with updating (166) the stored books over which UE IDs are to be detected (166). Here, a "new" cell 20 is a neighboring cell 20 for which there are no detected UE IDs 100 stored in the UE 14. Updating the stored books thus comprises adding a new book and/or replacing an existing book.

Processing then continues with the UE 14 finding/continuing to find (168) UE IDs from the HS-SCCH transmissions 30 in the selected cells 20. Next, the UE 16 considers whether there are benefits expected for undertaking IC processing with respect to any of the detected UE IDs 100. If not (No from 170), processing returns (172) to the method start, in anticipation of the next TTI. Here, determining whether there are expected IC processing benefits comprises, for example, evaluating the grades stored for the detected UE IDs 100 stored in the book(s) in association with the selected cells 20, to see whether any of them have a high enough grade to warrant IC performance.

If so (Yes from 170), processing continues with the UE 14 selecting (174), for example, the "top" candidates from the detected UE IDs 100 having a sufficiently high grade. The UE 14, for example, may select a fixed number of detected UE IDs 100 according to grade rank, or may take all detected UE IDs 100 having a grade above a defined grade threshold. Additionally, or alternatively, the UE 14 may select the candidates based on cell signal strength, etc.

Processing continues with decoding (176) the HS-SCCH transmissions 31 targeted to the other UEs 16 represented by the candidate detected UE IDs 100, and using (178) one or more of them in IC processing at the UE 14. That is, a candidate detected UE ID 100 is used to receive and properly decode an HS-SCCH transmission 31 to the corresponding UE 16, identify the corresponding HS-PDCH signal structure for the UE 16 from that decoded transmission, and use knowledge of the HS-PDCH signal structure to cancel interference at the UE 14.

In an extension of the method 160, the UE 14 may be configured to resolve selection decisions involving detected UE IDs 100 having the same grade using a random decision process. Alternatively, the UE 14 may choose between detected UE IDs 100 having the same grade but corresponding to different cells 20, based on considering the grade(s) of the other detected UE IDs 100 for those different cells.

Also, if more detected UE IDs 100 are candidates for IC processing than can be handled by the UE 14, the UE 14 may choose the one(s) with the lowest modulation order, where modulation possibilities are, for example, QPSK, 16 QAM, or 64 QAM. If this number is still too large, the UE 14 may randomly select from among the candidates. Further, as noted, it sometimes is of limited or no benefit for the UE 14 to attempt cancellation of interference arising from HS-PDSCH transmissions to another UE 16. For example, in a highly loaded cell environment, where limitations at the UE 14 allow it to select and cancel interference corresponding to only one other UE 16 among a potentially large number of interfering UEs 16, interference cancellation may not be helpful. Assuming that the limitation applies, a simple indication of such a condition is when the RSCP for the selected cell(s) 20 is small compared to the Received Signal Strength Indicator (RSSI).

However, assuming the UE 14 is already equipped with a multi-channel receiver 34 that is capable of receiving dual carrier transmissions, the method(s) described herein are readily implemented when the UE 14 is intended to receive its desired signal on a single carrier and therefore can use its remaining reception channel(s) for canceling one or more interfering signals on other carrier(s). Also note that the neighbor-cell scrambling codes (SCs) are required for channel estimation and HS-SCCH demodulation, but these are available to the UE 14 from higher layer signaling and/or from its cell-search process.

The present invention therefore offers a number of advantages. By way of example, the present invention enables IC for other-cell signals in HSDPA, but also IC or data-aided estimation algorithms utilizing other users' HS data within the serving cell 20 of the UE 14 ("own-cell").

The IC processing contemplated herein is not limited to a specific IC structure. Indeed, the structured-signal IC processing as contemplated herein may be pre- or post-decoding, may use Successive Interference Cancellation (SIC), Parallel Interference Cancellation (PIC), and/or joint detection (JD), where the interference estimates are included in the JD metrics. Broadly, then, the present invention provides a method for identifying an unknown UE ID from a received HS-SCCH transmission including the steps of decoding the received second part 35, generating candidate CRCs for a set of first part content hypotheses, with one candidate CRC being generated for each combination of first part content hypothesis and decoded second part values, extracting a set of UE ID hypotheses from the received CRC, with one UE ID hypothesis extracted for each candidate CRC, decoding the received first part using each extracted UE ID hypothesis, and assessing the corresponding decoding quality. Such a method is performed, for example, over a set of candidate HS-SCCH CC and Tx-div mode combinations, and it allows the UE 14 to maintain and update a list of currently detected UE configurations. Here, a "UE configuration" is the determined data transmission signal configuration that is or will be used for transmitting to another UE 16.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of detecting User Equipment (UE) Identifiers (IDs) for one or more other UEs operating in or around an area in which a first UE is operating, said method implemented by the first UE and comprising:
   receiving a High Speed Shared Control Channel (HS-SCCH) transmission targeted to another UE, wherein the HS-SCCH transmission includes a first part that is masked with the UE ID of the other UE, a second part that is not masked, and a Cyclic Redundancy Check (CRC) that is masked, said CRC computed over first part contents encoded in said first part and second part contents encoded in said second part;
   decoding the received second part to obtain decoded second part values, which are assumed to correctly represent the second part contents;
   extracting a set of UE ID hypotheses from the received CRC using the decoded second part values taken in combination with respective first part content hypotheses taken from a known set of possible first part contents;
   unmasking the received first part using each extracted UE ID hypothesis to obtain corresponding unmasked values and at least partially decoding the unmasked values for one or more of the extracted UE ID hypotheses, to obtain a decoding result for each of the one or more extracted UE ID hypotheses; and
   evaluating the decoding results to determine whether one of the extracted UE ID hypothesis is a detected UE ID and, if so, storing the detected UE ID.

2. The method of claim 1, wherein said step of evaluating comprises determining whether any of the decoding results exceeds a defined decoding quality threshold and, when such condition is met, identifying the extracted UE ID hypothesis corresponding to the decoding result having a highest decoding quality as the detected UE ID and storing the detected UE ID.

3. The method of claim 1, wherein said step of evaluating comprises identifying a first one of the one or more extracted UE ID hypotheses that yields a successful decoding result from the corresponding unmasked values.

4. The method of claim 1, wherein said extracting the set of UE ID hypotheses from the received CRC comprises generating a candidate CRC for every first part content hypothesis taken in combination with the decoded second part values, for every one of the candidate CRCs, obtaining a corresponding one of the extracted UE ID hypotheses by modulo 2 addition of the candidate CRC to the received CRC.

5. The method of claim 1, further comprising using the detected UE ID to decode information from an HS-SCCH transmission that is targeted to the other UE but is also received at the first UE, identifying a data signal structure for the other UE from the decoded information, and using knowledge of the data signal structure to perform structured-signal interference cancellation at the first UE with respect to one or more data transmissions targeting the other UE.

6. The method of claim 1, further comprising using the detected UE ID to eavesdrop on one or more HS-SCCH transmissions to the other UE, and using decoded information obtained from said eavesdropping to perform at least one of: channel estimation at the first UE for a desired signal targeting the first UE; and interference cancellation at the first UE for the desired signal.

7. The method of claim 1, further comprising performing the steps of claim 1 in an overall method of dynamically detecting UE IDs for a changing and generally unknown set of UEs that are served by one or more wireless communication network cells covering or neighboring the area in which the first UE is operating.

8. The method of claim 7, wherein said overall method includes maintaining cell-specific lists of detected UE IDs, based on repeatedly attempting to detect UE IDs in recurring intervals of time and, in any given interval, and performing interference cancellation processing at the first UE with respect to one or more candidate UEs represented in the cell-specific lists of detected UE IDs, based on:
using the detected UE ID of each candidate UE to decode an HS-SCCH transmission to the candidate UE;
determining from the decoded HS-SCCH transmission a signaling structure to be used for a data transmission to the candidate UE; and
canceling interference in a desired signal received at the first UE that arises from the data transmission to the candidate UE, using knowledge of the signaling structure.

9. The method of claim 8, wherein said performing interference cancellation processing at the first UE comprises conditionally performing interference cancellation, including determining whether to perform interference cancellation processing based on at least one of:
evaluating received signal strengths at the first UE with respect to one or more cells associated with one or more of the UEs represented in the cell-specific lists of detected UE IDs; and
evaluating numeric values maintained in the cell-specific lists in conjunction with the detected UE IDs in said cell-specific lists, said numeric values each reflecting one or more of:
the number of times the corresponding detected UE ID has been detected;
the number of times the corresponding detected UE ID has been used in prior performances of interference cancellation at the first UE; and
a relative signal strength at the first UE for the serving cell of the UE associated with the corresponding detected UE ID.

10. The method of claim 8, wherein said recurring intervals are Transmission Time Intervals (TTIs), and wherein said overall method is performed on a recurring basis across repeating TTIs.

11. The method of claim 1, further comprising performing the steps of claim 1 in an overall method of detecting UE IDs for a dynamically changing and unknown set of UEs that are operating in or around the area in which the first UE is operating, said overall method comprising:
for each candidate in a set of candidate HS-SCCH transmission formats, receiving a putative HS-SCCH transmission and attempting to detect a UE ID from said putative HS-SCCH transmission; and
storing any detected UE IDs in one or more lists maintained in a memory of the first UE and storing the associated candidate HS-SCCH transmission formats as the formats to be used by the first UE for reception of one or more HS-SCCH transmissions to the UEs corresponding to the detected UE IDs.

12. The method of claim 11, wherein said storing any detected UE IDs in the one or more lists comprises maintaining cell-specific lists of detected UE IDs.

13. The method of claim 11, further comprising repeating said overall method and correspondingly refreshing the one or more lists on a repeating basis.

14. The method of claim 13, wherein refreshing the one or more lists on said repeating basis comprises at least one of:
adding newly detected UE IDs to said one or more lists; and
deleting stale detected UE IDs from said one or more lists, including identifying any given detected UE ID in said one or more lists as being stale responsive to determining that the given detected UE ID has not been re-detected in n most recent repetitions of the method, where n is an integer value greater than or equal to one.

15. The method of claim 11, further comprising defining the set of candidate HS-SCCH transmission formats based on known combinations of coding channels and physical layer transmission formats that are defined for HS-SCCH transmissions.

16. A first User Equipment (UE) configured to detect UE Identifiers (IDs) for one or more other UEs operating in or around an area in which the first UE is operating, said first UE comprising:
a wireless communication transceiver configured to send and receive wireless signals, including receiving a High Speed Shared Control Channel (HS-SCCH) transmission targeted to another UE, wherein the HS-SCCH transmission includes a first part that is masked with the UE ID of the other UE, a second part that is not masked, and a Cyclic Redundancy Check (CRC) that is masked, said CRC computed over first part contents encoded in said first part and second part contents encoded in said second part; and
one or more processing circuits operatively associated with said wireless communication transceiver and configured to:
decode the received second part to obtain decoded second part values, which are assumed to correctly represent the second part contents;
extract a set of UE ID hypotheses from the received CRC using the decoded second part values taken in combination with respective first part content hypotheses taken from a known set of possible first part contents;
unmask the received first part using each extracted UE ID hypothesis to obtain corresponding unmasked values and at least partially decode the unmasked values for one or more of the extracted UE ID hypothesis, thereby obtaining a decoding result for each of the one or more extracted UE ID hypotheses; and
evaluate the decoding results to determine whether one of the extracted UE ID hypotheses is a detected UE ID and, if so, store the detected UE ID.

17. The first UE of claim 16, wherein said one or more processing circuits are configured to evaluate the decoding results based on being configured to determine whether any of the decoding results (94) exceeds a defined decoding quality threshold and, when such condition is met, identify the extracted UE ID hypothesis corresponding to the decoding result having a highest decoding quality as the detected UE ID and store the detected UE ID.

18. The first UE of claim 16, wherein said one or more processing circuits are configured to evaluate the decoding results based on being configured to identify a first one of the one or more extracted UE ID hypotheses that yields a successful decoding result from the corresponding unmasked values (90).

19. The first UE of claim 16, wherein said one or more processing circuits are configured to extract the set of UE ID hypotheses from the received CRC based on being configured to generate a candidate CRC for every first part content hypothesis taken in combination with the decoded second part values, and for every one of the candidate CRCs, obtain a corresponding one of the extracted UE ID hypotheses by modulo 2 addition of the candidate CRC to the received CRC.

20. The first UE of claim 16, wherein said one or more processing circuits include a first decoding circuit configured to decode the received second part, a UE ID extraction circuit configured to obtain said set of extracted UE ID hypotheses, a second decoding circuit configured to obtain the decoding results corresponding to the one or more of the of extracted UE ID hypotheses, and an evaluation circuit configured to detect UE IDs and to store said detected UE IDs.

21. The first UE of claim 16, wherein the one or more processing circuits are configured to:
use the detected UE ID to decode information from an HS-SCCH transmission that is targeted to the other UE but is also received at the first UE;
identify a data signal structure for the other UE from the decoded information; and
use knowledge of the data signal structure to perform structured-signal interference cancellation at the first UE with respect to one or more data transmissions targeting the other UE.

22. The first UE of claim 16, wherein the one or more processing circuits are configured to use the detected UE ID to eavesdrop on one or more HS-SCCH transmissions to the other UE, and further to use decoded information obtained from said eavesdropping to perform at least one of: channel estimation at the first UE for a desired signal targeting the first UE; and interference cancellation at the first UE for the desired signal.

23. The first UE of claim 16, wherein the one or more processing circuits are configured to dynamically detect UE IDs for a changing and generally unknown set of UEs that are served by one or more wireless communication network cells covering or neighboring the area in which the first UE is operating.

24. The first UE of claim 23, wherein said one or more processing circuits are configured to maintain cell-specific lists of detected UE IDs, based on repeatedly attempting to detect UE IDs in recurring intervals of time and, in any given interval, perform interference cancellation processing at the first UE with respect to one or more candidate UEs represented in the cell-specific lists of detected UE IDs, and wherein said one or more processing circuits perform said interference cancellation processing based on being configured to:
use the detected UE ID of each candidate UE to decode an HS-SCCH transmission to the candidate UE;
determine from the decoded HS-SCCH transmission a signaling structure to be used for a data transmission to the candidate UE; and
cancel interference in a desired signal received at the first UE that arises from the data transmission to the candidate UE, using knowledge of the signaling structure.

25. The first UE of claim 24, wherein said one or more processing circuits are configured to perform said interference cancellation processing on a conditional basis, in dependence on evaluating at least one of:
received signal strengths at the first UE with respect to one or more cells associated with one or more of the UEs represented in the cell-specific lists of detected UE IDs; and
numeric values maintained in the cell-specific lists in conjunction with the detected UE IDs, said numeric values each reflecting one or more of the number of times the corresponding detected UE ID has been detected, the number of times the corresponding detected UE ID has been used in prior performances of interference cancellation at the first UE, and a relative signal strength at the first UE for the serving cell of the UE associated with the corresponding detected UE ID.

26. The first UE of claim 24, wherein said recurring intervals of time are Transmission Time Intervals (TTIs), and wherein said one or more processing circuits are configured to attempt detection of UE IDs on a recurring basis across repeating TTIs.

27. The first UE of claim 16, wherein said one or more processing circuits are configured to detect UE IDs for a dynamically changing and unknown set of UEs that are operating in or around the area in which the first UE is operating, based on said one or more processing circuits of the first UE being configured to:
for each candidate in a set of candidate HS-SCCH transmission formats, receive a putative HS-SCCH transmission and attempt to detect a valid UE ID from said putative HS-SCCH transmission; and
store any detected UE IDs in one or more lists maintained in a memory of the first UE.

28. The first UE of claim 27, wherein said one or more processing circuits are configured to store any detected UE IDs in the one or more lists based on being configured to maintain cell-specific lists of detected UE IDs.

29. The first UE of claim 27, wherein said one or more processing circuits are configured to repeatedly attempt detection of UE IDs, and to correspondingly refresh the one or more lists on a repeating basis.

30. The first UE of claim 29, wherein said one or more processing circuits of the first UE are configured to refresh the one or more lists on said repeating basis based on being configured to perform at least one of:
add newly detected UE IDs to said one or more lists; and
delete stale detected UE IDs from said one or more lists, including identifying any given detected UE ID in said one or more lists as being stale responsive to determining that the given detected UE ID has not been re-detected in n most recent detection attempts by the first UE, where n is an integer value greater than or equal to one.

31. The first UE of claim 27, wherein said one or more processing circuits are configured to define the set of candidate HS-SCCH transmission formats based on known combinations of coding channels and physical layer transmission formats that are defined for HS-SCCH transmissions.

* * * * *

UNITED STATES PATENT AND TRADEMARK OFFICE
CERTIFICATE OF CORRECTION

PATENT NO. : 8,483,215 B2  
APPLICATION NO. : 13/291900  
DATED : July 9, 2013  
INVENTOR(S) : Jonsson et al.

Page 1 of 1

It is certified that error appears in the above-identified patent and that said Letters Patent is hereby corrected as shown below:

In the Specification

In Column 7, Line 50, delete "cell 22." and insert -- cell 20. --, therefor.

In Column 8, Line 27, delete "cell 22," and insert -- cell 20, --, therefor.

In Column 8, Line 28, delete "cell 22." and insert -- cell 20. --, therefor.

In Column 10, Lines 12-13, delete "first part content hypotheses 84," and insert -- first part content hypotheses 86, --, therefor.

In Column 16, Line 21, delete "$i_{max})$" and insert -- $i_{max}$, --, therefor.

In Column 17, Line 44, delete "traffice" and insert -- traffic --, therefor.

In the Claims

In Column 22, Line 61, in Claim 17, delete "results (94)" and insert -- results --, therefor.

In Column 23, Line 4, in Claim 18, delete "values (90)." and insert -- values. --, therefor.

In Column 23, Line 18, in Claim 20, delete "of the of" and insert -- of the --, therefor.

Signed and Sealed this  
Thirty-first Day of December, 2013

Margaret A. Focarino  
*Commissioner for Patents of the United States Patent and Trademark Office*